Aug. 16, 1966 E. P. SUPERNOR 3,266,344
COUNTERSINK ATTACHMENT
Filed Aug. 29, 1963 2 Sheets-Sheet 1
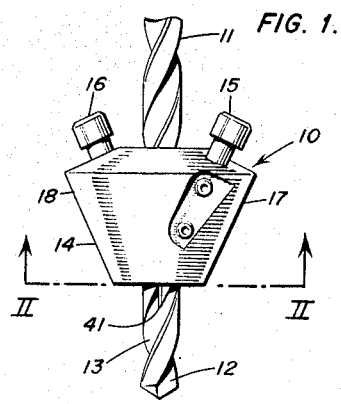
FIG. 1.
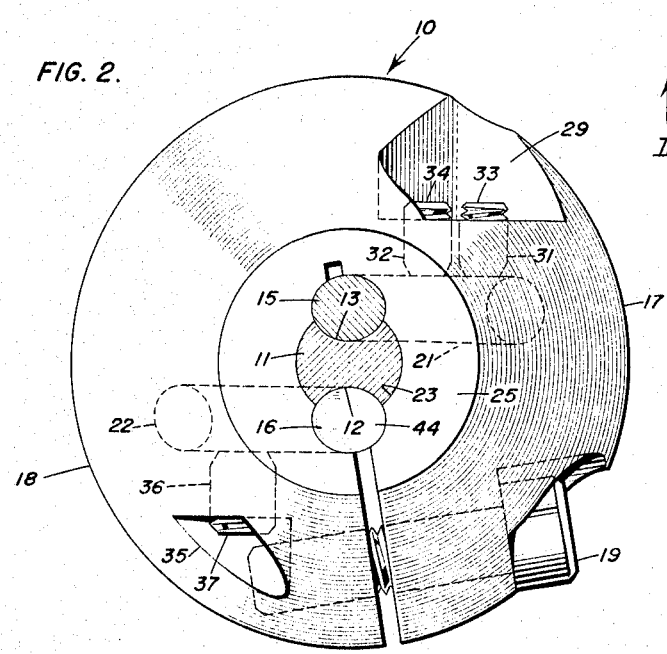
FIG. 2.
FIG. 3.
EUGENE P. SUPERNOR
INVENTOR
BY *Howard S. Blodgett*
ATTORNEY Aug. 16, 1966 E. P. SUPERNOR 3,266,344
COUNTERSINK ATTACHMENT
Filed Aug. 29, 1963 2 Sheets-Sheet 2
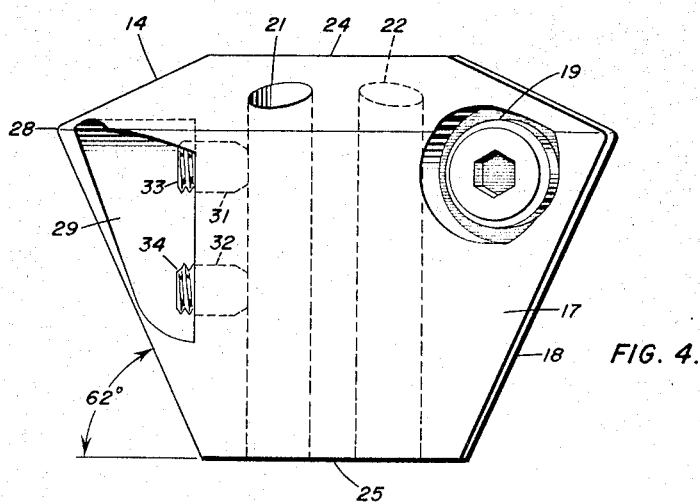
FIG. 4.
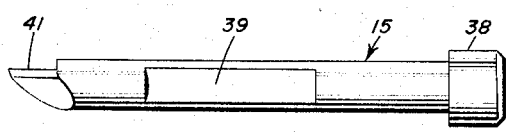
FIG. 5.
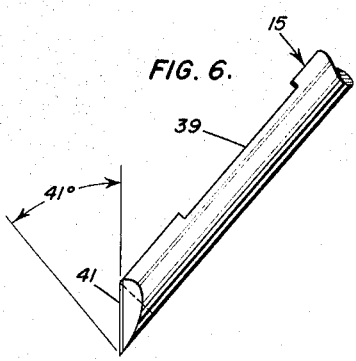
FIG. 6.
FIG. 7.
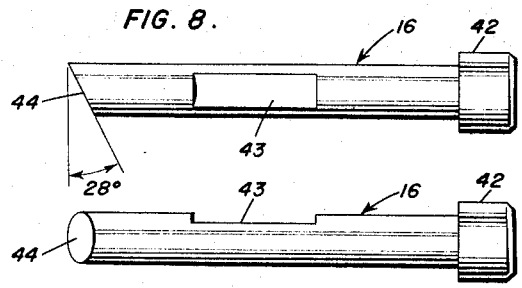
FIG. 8.
FIG. 9.
EUGENE P. SUPERNOR
INVENTOR
BY *Norman S. Blodgett*
ATTORNEY

United States Patent Office 3,266,344
Patented August 16, 1966

3,266,344
COUNTERSINK ATTACHMENT
Eugene P. Supernor, Worcester, Mass., assignor to The Heald Machine Company, Worcester, Mass., a corporation of Delaware
Filed Aug. 29, 1963, Ser. No. 305,274
4 Claims. (Cl. 77—66)

This invention relates to a countersink attachment and, more particularly, to apparatus arranged to be mounted on a drill for the purpose of beveling the entrance to a bore produced by the drill.

It is common practice when drilling a hole, particularly when a bore is being formed that is later to be threaded, to mount on the drill an attachment which forms a bevel around the upper edge of the bore when the drill has worked its way a predetermined distance into the workpiece. When this procedure is used with automatic machinery, such as automatically-controlled drill presses, boring machines, and the like, a considerable difficulty is experienced because the chips from the beveling operation have a tendency to follow the flutes of the drill and to work their way into the countersink attachment. The chips which accumulate in this manner eventually render the attachment inoperative and may result in breakage of the drill or damage to the machine, as well as to the workpiece. These and other difficulties experienced with the prior art devices have been obviated in a novel manner by the present invention.

It is, therefore, an outstanding object of the invention to provide a countersink attachment which will not be rendered inoperative by chips from the workpiece.

Another object of this invention is the provision of a countersink attachment which is simple and rugged in construction and which cannot easily be rendered inoperative.

A further object of the present invention is the provision of a countersink attachment in which chips cannot slide up the flutes of the drill into the attachment.

It is another object of the instant invention to provide a countersink attachment for use on a drill which will work effectively in automatic machinery and which will operate for an indefinite period without attention from the operator.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which:

FIG. 1 is an elevational view of a countersink attachment embodying the principles of the present invention, FIG. 2 is a horizontal view of the invention taken on the line II—II of FIG. 1, FIG. 3 is an enlarged elevational view of the invention taken from the same aspect as FIG. 1, FIG. 4 is an elevational view of the invention taken from an aspect as viewed from the right in FIG. 3, FIGS. 5, 6, and 7 show various views of a cutting tool forming a part of the invention, and FIGS. 8 and 9 show a top and elevational view of another element used in the invention.

Referring first to FIG. 1, which shows the general features of the invention, the countersink attachment, indicated generally by the reference numeral 10, is shown in use with a drill 11 having two helical flutes 12 and 13. The attachment 10 consists of a main body 14 through which extends a cutting tool 15 and a dummy element 16.

Referring to FIG. 2, it can be seen that the main body 14 is split into two parts 17 and 18 by a slot which is held together by a bolt 19. Extending through the part 17 is an oblique bore 21 which carries the cutting tool 15. Extending through the part 18 is an oblique bore 22 which carries the dummy element 16. Extending through the body 14 and formed partly in the part 17 and partly in the part 18 is a bore 23 adapted to carry the drill 11; although the two parts 17 and 18 are shown as having a substantial gap between them, this is only for the purposes of illustration and, as a practical matter, the parts are formed so that they are very close together when the bore 23 fits tightly around the drill 11.

Referring to FIG. 3, it can be seen that the main body 14 is provided with an upper flat surface 24 which extends transversely to the axis of the bore 23 and the drill 11 and a bottom flat surface 25 which is parallel to the surface 24 and considerably spaced from it. Extending downwardly and outwardly away from the top flat surface 24 is a frusto-conical surface 26, while extending upwardly and outwardly from the bottom flat surface 25 is a frusto-conical surface 27. The conical surfaces 26 and 27 meet at the largest part of the main member on a circular line to form a corner 28. The part 17 is formed with an inclined flat recess 29 having two threaded bores 31 and 32 (see FIG. 4) into which extend socket-head set screws 33 and 34. These set screws are aligned with the axis of and extend into the oblique bore 21 which carries the cutting tool 15.

Referring to FIG. 3, it can be seen that the portion 18 of the main body is provided with a flat recess 35 into which enters a threaded bore 36 carrying a socket-head set screw 37 which is aligned with the axis of the oblique bore 22 and enters it to press against the dummy element 16 carried therein.

Referring to FIG. 4, it can be seen that the generatrices of the frusto-conical surface 27 lie at an angle of approximately 62° to the bottom flat surface 25 of the main body. As is evident also in FIG. 4, as well as FIG. 2, the axes of the oblique bores 21 and 22 lie in vertical planes which are parallel to the axis of the bore 23.

Referring to FIGS. 5, 6, and 7, the cutting tool 15 is shown as provided with an enlarged head 38 to prevent it from slipping into the oblique bore 21. It is also provided with a flat surface 39 adapted to be engaged by the set screws 31 and 32 to hold it in place and with a cutting edge 41 suitably ground to form the desired chamber on the edge of the bore being formed in the workpiece.

In FIGS. 8 and 9, it can be seen that the dummy element 16 is provided with a head 42 to prevent it from falling into the oblique bore 22 and is also provided with a flat surface 43 adapted to be engaged by the set screw 37. The end opposite the head 42 is provided with a flat end surface 44 which extends at an angle of approximately 28° to the axis of the element. This is the same angle of obliqueness as the oblique bore 22 so that the surface 44 is flush with the bottom flat surface 25 of the main body.

The operation of the invention will now be readily understood in view of the above description. The countersink attachment 10 is mounted on the drill 11 by tightening up on the bolt 19 bringing the two halves of the two parts 17 and 18 together to clamp around the drill surface. The drill is mounted in a drill press or similar machine tool which provides for rotating it and advancing it toward the workpiece for forming a bore. The dummy element 16 is located in the bore 22 in such a way that its end surface 44 is in the plane of the bottom flat surface 25 of the main body 14. The cutting tool 15, on the other hand, is located both angularly and lengthwise by means of the set screws 33 and 34, is arranged so its cutting edge 41 will eventually engage the edge of the hole being cut with the drill 19 and provide it with a bevel. As is very much evident in FIG. 2, the dummy element 16 in the plane of the flat bottom surface 25 lies partly in the oblique bore 22 as it emerges from the part 18 of the main body and partly in the flute 12 of the drill 11. Similarly, the cutting tool 15 lies in its bore 21 and in the flute 13, but extends downwardly well beyond the flat surface 25 of the main body.

As the drill 11 and the countersink attachment 10 are advanced toward the work, the drill, of course, forms a bore in the workpiece. Eventually, the cutting surface 41 of the cutting tool 15 will also engage the workpiece. The tool 15 resides in the flute 13 of the drill so that the cutting edge 41 lies partly within the flute 13 where it will not engage the workpiece and partly outside of it where it is at a substantial angle to the axis of the drill. It will engage the workpiece and form the desired bevel on the edge of the opening into the workpiece. As is evident in FIG. 2, however, the cutting tool 15 in the plane of the bottom surface 25 and the dummy element 16 in that same plane completely fill the flutes of the drill so that there are no openings for chips from the chamfering operation to enter the countersink attachment and to cause it to jam. In this way, the cutting action will take place smoothly and without the necessity of constant supervision by an operator; there will be no need to shut down the machine because the countersink attachment has become dangerously jammed with chips, or because such jamming has caused the countersink attachment to break the tool or caused the workpiece to be damaged.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A countersink attachment for a drill having two flutes, comprising
   (a) a main body having a bore through which the drill is adapted to pass and having a means for locking the body in place on the drill,
   (b) a tool passing through the main body, the tool having a cutting edge emerging from the main body at a portion which faces the point of the drill, and having a cylindrical surface adapted to lie in a flute of the drill adjacent the said edge, and
   (c) a dummy element passing through the main body and adapted to lie in the other flute at the said portion of the main body, a straight passage being provided through the main body for the tool and a straight passage being provided for the dummy element, the passages extending at substantial angles to the axis of the said bore, the passages being of circular cylindrical form and the angle being such that a horizontal plane perpendicular to the axis of the bore intersects on the surface of the passages an elliptical plane figure a substantial portion of which lies on the surface of the said flute.

2. A countersink attachment as recited in claim 1, wherein the angles are the same as the lead angles of the drill flutes.

3. A countersink attachment for a drill having two flutes, comprising
   (a) a main body having a bore through which the drill is adapted to pass and having a means for locking the body in place on the drill, the main body being provided with a flat surface extending at a right angle to the axis of the bore and facing toward the drill tip,
   (b) a tool passing through the main body, the tool having a cutting edge emerging from the main body at a portion which faces the point of the drill, and having a cylindrical surface adapted to lie in a flute of the drill adjacent the said edge,
   (c) and a dummy element passing through the main body and adapted to lie in the other flute at the said portion of the main body, the drill, the tool and the dummy element emerging from the main body to define with the said surface of the main body a plane figure having the shape of a circle intersected by two ellipses.

4. A countersink attachment for a drill having two helical flutes, comprising
   (a) a main body having a bore through which the drill is adapted to pass and having a flat surface extending at a right angle to the axis of the bore and adapted to face toward the drill tip, the main body also having two secondary bores lying at substantial angles to the axis of the bore and intersecting the bore adjacent the said surface, the three bores emerging from the main body to define an opening in the said flat surface in the form of a circle intersected by two ellipses,
   (b) a cutting tool lying in one of the secondary bores and completely occupying one of the flutes in the plane of the said surface, and
   (c) a dummy element lying in the other of the secondary bores and completely occupying the other of the flutes in the plane of the said surface, the drill, the tool, and the dummy element entirely occupying the said opening in the said flat surface of the main body.

References Cited by the Examiner

UNITED STATES PATENTS 745,048 11/1903 Fuhrer _____ 77—66

WILLIAM W. DYER, Jr., *Primary Examiner.*

FRANCIS S. HUSAR, *Examiner.*